United States Patent [19]

Miki et al.

[11] Patent Number: 4,923,530

[45] Date of Patent: May 8, 1990

[54] BRAZING FLUX OF STABLE SUSPENSION FOR ALUMINUM MATERIAL

[76] Inventors: Nobuhiro Miki, 23-14-521, Tezukayama 1-Chome, Abeno-ku, Osaka; Toshiro Fukudome, 68-335, Oaza kobuki, Chihaya akasaka-mura, Minami kawachi-gun, Osaka-fu; Takesi Kaibori, 98-2, Mozunishino-cho 1-Chome, Sakai-shi, Osaka-fu, all of Japan

[21] Appl. No.: 349,299

[22] Filed: May 9, 1989

[51] Int. Cl.$^5$ .............................................. B23K 35/34
[52] U.S. Cl. ....................................................... 148/26
[58] Field of Search ......................................... 148/26

[56] References Cited

U.S. PATENT DOCUMENTS

| | | | |
|---|---|---|---|
| 4,204,889 | 5/1980 | Allen | 148/26 |
| 4,368,371 | 1/1983 | Dilthey | 148/26 |
| 4,475,960 | 10/1984 | Yamawaki | 148/26 |
| 4,643,348 | 2/1987 | Takahashi | 148/26 |

*Primary Examiner*—Peter D. Rosenberg
*Attorney, Agent, or Firm*—Armstrong, Nikaido, Marmelstein, Kubovcik & Murray

[57] ABSTRACT

A brazing flux for aluminum material having superior suspension stability whose melting composition of the flux is composed of four elements of $M_xAlF_yO_z$ (where: $x=0.5$ to $2.0$, $y=1.5$ to $4.8$ and $z=0.1$ to $1.0$), and a method of producing a brazing flux in which an amorphous aluminum hydroxide is employed as an aluminum raw material to prepare the flux.

9 Claims, 2 Drawing Sheets

BRAZING FLUX OF STABLE SUSPENSION FOR ALUMINUM MATERIAL

BACKGROUND OF THE INVENTION

1. Field of the invention:

The present invention relates to a brazing flux and a production process thereof and, more specifically, to a brazing flux suitable for aluminum and aluminum alloy of a heat exchanger made of aluminum, in particular, used in a car cooler and a production process of the flux.

2. Description of prior art

As is well known, brazing of aluminum or aluminum alloy (hereinafter referred collectively to as "aluminum material") is performed by using a flux. Recently, corrosion resistant fluoride flux has been increasingly used as the brazing flux. The flux of this kind has a melting point lower than eutectic aluminum-silicon alloys (i.e., composites having their melting points in the range of 520° to 620° C.) and has an advantage of being very active and effective in the aspect of accelerating wetting property of brazing filler metal in a melting state by breaking and removing oxide film formed on the aluminum matrix and brazing surface or by reducing interfacial tension. Furthermore, the flux of this kind has another great advantage of being not necessary to be removed after completing the welding because the flux is transformed into an inactive compound having no hygroscopic property, solubility and reactivity after cooling and solidification.

It has been a recent trend to require brazing flux to exhibit following higher performances corresponding to fine and complicated structure of aluminum material:

(a) As the temperature control of brazing is more difficult with increasing complexity in structure of aluminum material to be brazed, a flux of further low melting point is required; and (b) For the purpose of evenly applying the flux to the brazing surface of an object of complicated structure, suspension stability of flux particles in water is fatally important.

In other words, in the steps of causing a flux to suspend in water, dipping a structure to be brazed in water, picking it up, and forming a flux layer on the brazing surface, it is essential to disperse flux particles evenly in the liquid without sedimentation from the viewpoint of perfect brazing.

As one of the fluoride fluxes of this kind, there is a flux of fluoroaluminate of alkali metal, and, for example, following methods of producing this flux were known:

(1) U.S. Pat. No. 3,951,328 discloses a method comprising the steps of mixing aluminum fluoride and potassium fluoride, melting the mixture by heating, and grinding it into fine particles after cooling and solidification thereof.

(2) G.B. Pat. No. 1,055,914 discloses a reaction method comprising the step of kneading fine particles of aluminum fluoride and potassium fluoride with water.

(3) Japanese Laid-Open Patent Publications (unexamined) Nos. 60-203395 and 60-204616 disclose a reaction method comprising the steps of dissolving aluminum hydroxide into hydrofluoric acid, and causing potassium hydroxide solution to act thereon in the temperature range of 30° to 100° C. and under acidity condition (pH=4 and below).

(4) J. Am Ceram. Soc. Vol.49, P.631 (1961) discloses a method comprising the steps of adding alkali metal fluoride to HF solution of $AlF_3$, and precipitating $K_2AlF_5H_2O$.

(5) "Inorganic and Theoretical Chemistry", Vol. 5, P.306 (1961) discloses a method for obtaining $K_2AlF_5$ comprising the step of causing aluminum hydroxide to act on aqueous solution of potassium bifluoride.

(6) Japanese Laid-Open Patent Publication (unexamined) No. 61-162295 discloses a method for obtaining a complex compound called cesium fluoroaluminate composed of $AlF_3$ and $CsF$, and mole ratio of $AlF_3/CsF$ is in the range of 67/33 to 26/74.

In both methods (1) and (2) mentioned above, precomposed materials fluoride are used and coupled by melting process or wet kneading process The method (1) has a disadvantage of requiring processes of considerably consuming energy and grinding the solid mixture produced of the melted materials into fine particles of 150 to 200 micron meter, before putting into practical use.

The method (2) has a disadvantage of delay in the reaction with potassium fluoride and residual of materials left without reaction, unless the aluminum fluoride material is ground into sufficiently fine particles. In spite of necessity of such grinding process, size of the fine particles obtained by both methods (1) and (2) mentioned above is as large as several hundred micron meter, and therefore the fine particles of this size do not suspend in water but separate and precipitate. It was reported that the melting point of this flux was 560° C. in both methods (1) and (2).

The method (3) discloses a production process by chemical reaction, and in which no grinding step is required. But the product obtained is a crystalline compound having no property of suspension in water. It was reported that the melting point of this flux was also 560° C.

The method (4) discloses that $K_2AlF_5\cdot H_2O$ is produced by chemical reaction, and the product thus obtained is also a crystalline compound having no property of suspension in water. It was recognized as a result of measurement that the melting point of the flux was 588° C.

The method (5) merely reports that $K_2AlF_5$ is produced by the reaction between potassium bifluoride and aluminum hydroxide.

With regard to cesium fluoroaluminate composites such as $Cs_3AlF_6$, $Cs_3AlF_5$ $H_2O$, $CsAlF_4$ or the like obtained by the method (6), it was found that the melting points thereof were as low as 450° C., but that suspension stability in water was poor eventually resulting in separation and sedimentation. Moreover, the compound of fluoroaluminate of alkali metal produced by the conventional method was a crystalline compound of $MAlF_4$, $M_2AlF_5\cdot H_2O$ and/or $M_3AlF_6$ having a property of sedimentation, and as a result fluxes obtained by the conventional methods are the one having poor suspension stability in water.

SUMMARY OF THE INVENTION.

The present invention was made to solve the above-discussed problems common to the conventional fluxes of fluoroaluminate of alkali metal salt and has an object of providing a novel brazing flux of low melting point in the for of fine particles, and having superior suspension stability in water.

In order to accomplish the foregoing object, the inventors have been engaged in a wide range of researches of brazing flux suitable for aluminum material and production process thereof, and as the result succeeded in developing a fluoroaluminate of alkali metal which is novel in both physical property and composition.

More specifically, when producing the flux of fluoroaluminate of alkali metal, amorphous aluminum hydroxide which has been never used in the prior art is employed as aluminum material, whereby a complicated multi-component flux is obtained, and melting composition of this flux is established to be of four elements of $M_xAlF_yO_z$ ($x=0.5$ to $2.0$, $y=1.5$ to $4.8$, $z=0.1$ to $1.0$).

The flux of fluoroaluminate of alkali metal according to the invention is a multi-component of very fine particles which is composed by a novel reaction method and has a novel melting salt composition. The flux of fluoroaluminate of alkali metal has quite desirable physical properties as a flux, i.e., high suspension stability and low melting point.

The inventors found that, when adding amorphous aluminum hydroxide to a product obtained by reaction between hydrofluoric acid and alkali metal fluoride, hydroxide or carbonate otherwise adding alkali metal fluoride, hydroxide or carbonate to a product obtained by reaction between hydrofluoric acid and amorphous aluminum hydroxide, a solid-liquid reaction took place with generation of heat, and varieties of complicated chemical reactions go on at the same time. As a result, it was found that an extremely fine multi-component product was produced in the form of suspension.

FIG. 1 shows the melting composition of the reaction product in the form of a diagram of four element composition of $M_xAF_yO_z$.

In the drawing, x, y and z respectively indicates an atomic ratio of M, F and 0 to 1 of Al, and in which x shows axis of ardinates while y showing axis of abscissa, and lines where $z=0$, $0.25$, $0.5$, $0.75$ and $1.0$ are respectively drawn.

In this FIG. 1, an area outlined with fat solid line indicates the scope of the melting composition of the reaction product according to the invention.

As is shown in FIG. 2, it may be said the chemical property of the reaction product obtained by using amorphous aluminum hydroxide having no crystal structure at all exhibits the physical properties peculiar to the flux of the invention. In other words, the fact that the flux of the invention is formed of very fine particles and quite stable in their suspension state and melting point thereof is low as a result of the fact that the reaction product is composed of such multi-components as hydroxy compound, amorphous compound and unstationary compound.

Furthermore, since the flux of the invention is of very fine particles, specific surface area thereof is very large. Table 1 shows specific surface areas of the fluxes of Examples 1 to 3 which were measured by BET method.

TABLE 1

| Product | Specific surface area $(cm^2/g)$ (BET method) |
|---|---|
| Obtained by the invention (Examples 1 to 3) | 80,000 to 110,000 |
| Obtained by using crystalline aluminum hydroxide as material (Comparative Example 3) | 26,000 |
| Commercially available flux for welding aluminum | 19,000 |

From the table, it is to be noted that the patent obtained by the invention is formed of very fine particles and the specific surface area thereof is very large as compared with the product obtained by using crystalline aluminum. Superior performance of the product composed of such very fine particles when used as flux is now described hereinafter.

Concentration of the reaction product can be freely controlled by freely selecting concentration of the reaction system and, therefore, it is possible to obtain a slurry concentrated to 50 to 60%. The slurry is diluted with water according to welding purpose and put into use in the concentration range of 5 to 10%. In the processes of production, transport and storage of the flux, it is convenient to handle the slurry in the form of concentrated one. The concentrated slurry slightly once sedimented during a long period of storage returns easily to an even suspension state just by inverting the container otherwise shaking it. An object to be brazed can be dipped in the slurry as it is or after dilution with water, then picked out of the slurry, thus a flux layer being formed evenly on the brazing surface.

Any flux obtained by the other known composition process is a crystalline compound and, therefore, no suspension state as is contemplated by the invention will be achieved no matter how the crystalline compound is ground into fine particles through a grinding process. That is, if the slurry of crystalline compound concentrated to 50 to 60% is stored for a long period of time, the sedimented particles are completely consolidated, and it is impossible to return the slurry to suspension state in the container, which means that such flux is restrained to the storage in the form of particles and the use after mixing with water immediately before application.

On the other hand, the flux of the invention has a great advantage of being capable of being handled in the form of slurry throughout every process of production, storage, preparation and use.

The flux of the invention is significantly advantageous not only in terms of non-consolidation mentioned above but also in terms of suspension stability at a diluted concentration.

The high suspension stability mentioned above is one of the important physical properties of the flux of this kind, particularly in view of forming an even flux layer on the surface of a structure of complicated configuration by dipping it in the flux suspension and picking it up.

The fat solid line of FIG. 1 encloses a composition area in which suspension stability is preferable.

The suspension stability was evaluated in terms of suspension layer holding ratio (i.e., ratio of suspension layer to full length, which will be 100% in the event of no sedimentation at all or 50% in the event of sedimentation by half) when preparing a water suspension of 5% flux concentration, shaking well the 100cc of the suspension in a capped cylinder and leaving it for two hour stationarily.

Since the brazing flux melts at a temperature lower than that of brazing filler metal and acts on the surfaces of both aluminum matrix and brazing filler metal in order to clean the surfaces by removing oxide film and the like thereon, it is essential that there is a difference in melting point between the brazing flux and the filler metal.

Melting point of the $M_xAlF_yO_z$ composite of the invention varies depending on alkali metal M. That is, when M is Li, the melting point is 690° to 710° C.;
when M is Na, the melting point is 670° to 730° C.;
when M is K, the melting point is 535° to 550° C.;
when M is Rb, the melting point is 490° to 510° C.; and
when M is Cs, the melting point is 410° to 440° C.

Among the alkali metals mentioned above, composites of potassium salt, rubidium salt and cesium salt, whose melting points are relatively low, are preferable as brazing flux for aluminum material when used singly or in combination with other composite.

For example, melting points of lithium salt and sodium salt are considerably lowered when mixed with potassium salt, and the mixture is quite desirable when used as a brazing flux for aluminum material.

Described hereinafter is a production process of the flux in accordance with the invention.

The flux of the invention can be produced by adding amorphous aluminum hydroxide to a product obtained by reaction between hydrofluoric acid and alkali metallic salt, otherwise adding alkali metallic salt to a product obtained by reaction between hydrofluoric acid and amorphous aluminum hydroxide.

The alkali metallic salt to be employed may be any of the fluoride, oxide, hydroxide or carbonate.

Composition can be varied by changing mixing ratio among alkali metal, amorphous aluminum hydroxide and hydrofluoric acid and controlling pH of the reaction solution obtained at the time of completing the reaction within the range of 5 to 10, thus reaction products over a wide range of composition being obtained.

If pH of the reaction liquid at the time of completing the reaction is not more than 4 or not less than 11, there is the possibility that the aluminum material is corroded b brazing due to such acid or alkali. Accordingly, amount of alkalimetal, amorphous aluminum hydroxide and hydrofluoric acid to be used should be adjusted so that pH of the reaction liquid at the time of completing the reaction may be within the range of 5 to 10.

The reaction mentioned above is preferably carried out within the range of room temperature to boiling point of the reaction mixture. The reaction can be carried out easily and smoothly in rather short time by heating to 50° to 60° C.

In effect, the flux of the invention obtained by reaction among hydrofluoric acid, alkali metallic salt and amorphous aluminum hydroxide is produced in the form of very fine particles by chemical process alone without physical or mechanical process such as melting or grinding which is inefficient and uneconomical requiring consumption of large amount of energy. As a result, the flux of the invention contributes a lot to improvement in productivity and economy.

Furthermore, since the flux of the invention is superior in terms of suspension stability with water, the flux is very useful when used as brazing flux for aluminum material in suspension state, which means expansion of the application of flux.

Other objects and advantages of the invention will becomes apparent in the course of the following description with the accompanying drawings.

DESCRIPTION OF THE EXAMPLES

Figure 1:
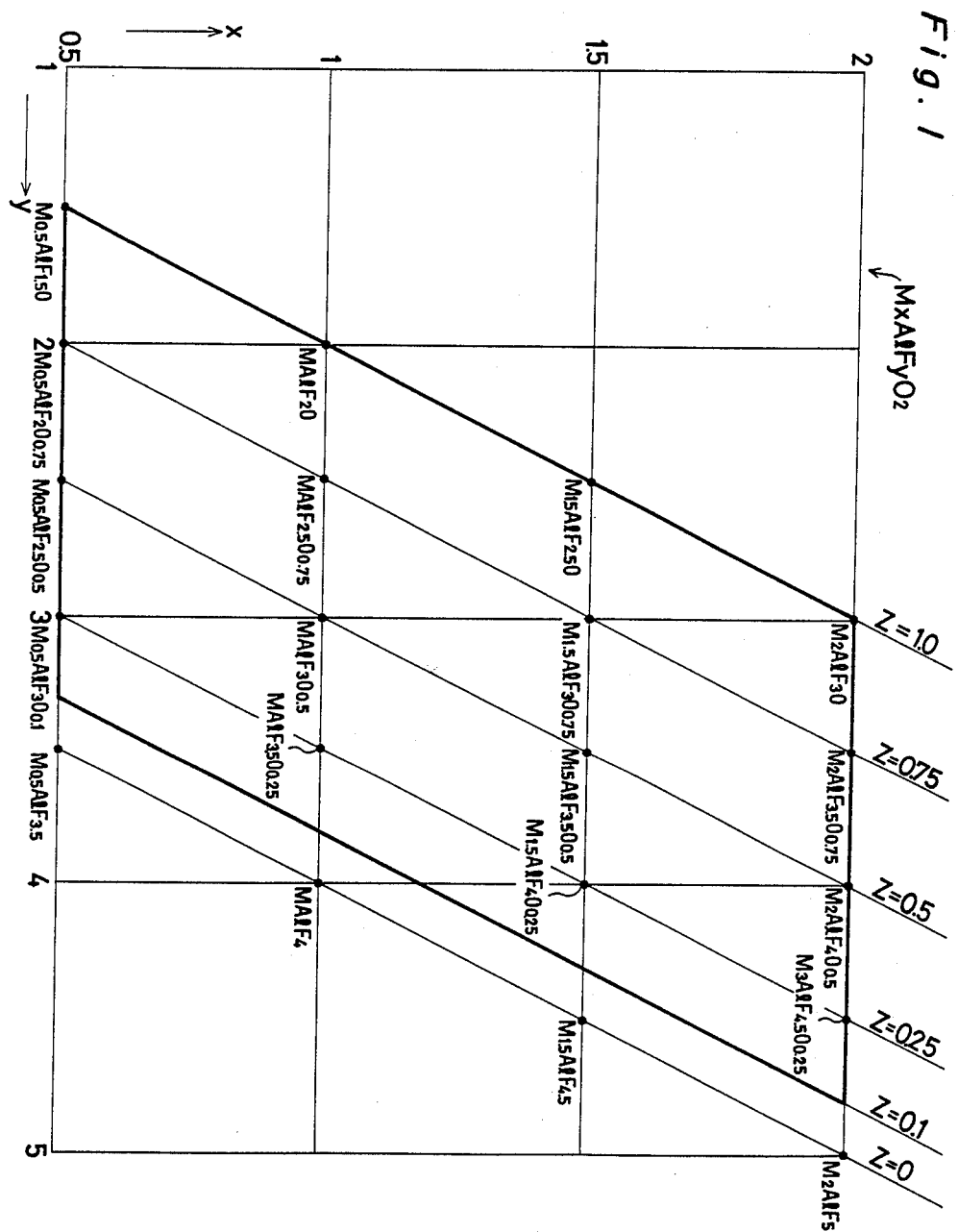
FIG. 1 is a composition diagram of $M_xAlF_yO_z$, in which axis of ordinates x indicates an atomic ratio of alkali metal to 1 of Al, axis of abscissa y indicates an atomic ratio of F to 1 of Al, and z indicates an atomic ratio of 0 to 1 of Al. In the drawing, representative compositions of four elements are shown as examples, and the area enclosed by fat solid lines corresponds to what is claimed by the present application.
Figure 2:
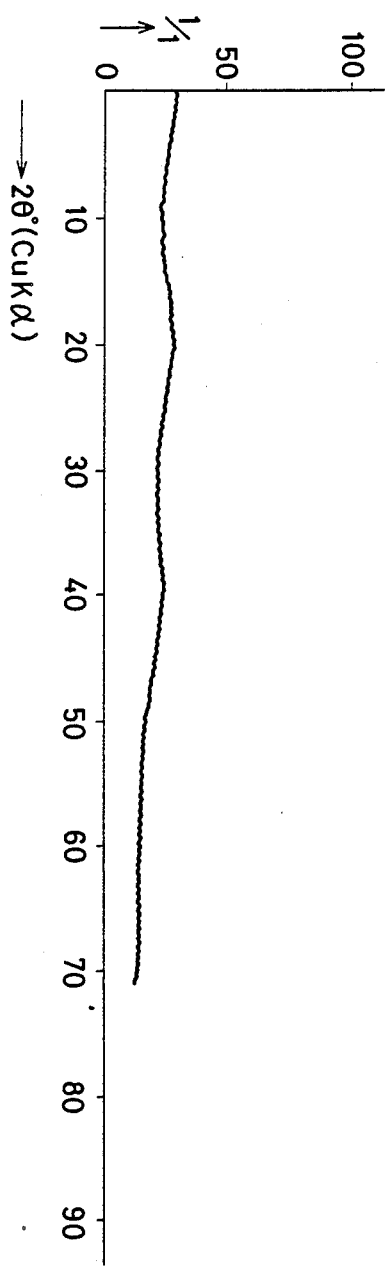
FIG. 2 is a X-ray analysis diagram of the amorphous aluminum hydroxide used as a raw material to produce the flux of the invention.

To disclose the technical aspects of the present invention more specifically, typical examples are hereinafter described.

EXAMPLES 1 to 8

With regard to $K_xAlF_yO_z$, $Rb_xAlF_yO_z$, and $Cs_xAlF_yO_z$, 50% by weight of hydrofluoric acid, 99% by weight of alkali metal and amorphous aluminum hydroxide containing 53.3% by weight of $Al_2O_3$ were caused to act thereon for one hour while stirring them. The reaction temperature increased from ambient temperature to about 90° C. due to generation of heat. Table 2 shows mixing ratio of the raw materials, pH of the liquid at the time of completing the reaction, melting composition, melting point and suspension stability of the reaction products.

TABLE 2

| | Material amount used (g) | | | | | | | |
|---|---|---|---|---|---|---|---|---|
| Ex. | 50% hydrofluoric acid | Amorphous aluminum hydroxide | Alkali metal salt Kind | Amt. | Melting composition | pH after reaction | Melting point (°C.) | Suspension stability (%) |
| 1 | 211 | 287 | KF | 132 | $K_{0.75}AlF_{2.5}O_{0.63}$ | 7.6 | 534 | 79 |
| 2 | 400 | 478 | KF | 294 | $KAlF_3O_{0.5}$ | 8.7 | 546 | 79 |
| 3 | 501 | 478 | KF | 294 | $KAlF_{3.5}O_{0.25}$ | 6.4 | 543 | 82 |
| 4 | 120 | 145 | $Rb_2CO_3$ | 173 | $RbAlF_3O_{0.5}$ | 10.0 | 508 | 98 |
| 5 | 60 | 58 | RbF | 73 | $RbAl_{3.5}O_{0.25}$ | 5.5 | 492 | 82 |
| 6 | 46 | 40 | CsF | 51 | $Cs_{0.75}AlF_{2.75}O_{0.25}$ | 9 | 420 | 100 |
| 7 | 58 | 40 | $Cs_2CO_3$ | 68 | $CsAlF_{2.75}O_{0.25}$ | 8 | 414 | 100 |
| 8 | 105 | 72 | $Cs_2CO_3$ | 184 | $Cs_{1.5}AlF_{3.5}O_{0.5}$ | 9 | 438 | 94 |

COMPARATIVE EXAMPLES 1 to 6

With regard to $K_xAlF_yO_z$, $Rb_xAlF_yO_z$, and $Cs_xAlF_yO_z$, 50% by weight of hydrofluoric acid, 99% by weight of alkali metal and amorphous aluminum hydroxide containing 53.3% by weight of $Al_2O_3$ or 99% by weight of crystalline aluminum hydroxide were caused to act thereon for one hour while stirring them. The reaction temperature increased to about 90° C. due to generation of heat. Table 3 shows mixing ratio of the raw materials, pH of the liquid at the time of completing the reaction, melting composition, melting point and suspension stability of the reaction products.

TABLE 3

| Comp. ex. | Material amount used (g) | | | | | Melting Composition | pH after reaction | Melting point (°C.) | Suspension stability (%) |
|---|---|---|---|---|---|---|---|---|---|
| | 50% hydrofluoric acid | Amorphous aluminum hydroxide | Crystalline aluminum hydroxide | Alkali metal salt | | | | | |
| | | | | Kind | Amt. | | | | |
| 1 | 96 | 260 | | KF | 140 | $K_{0.88}AlF_{1.76}O_{1.06}$ | 10.5 | 850 | 20 |
| 2 | 418 | | 274 | KF | 245 | $K_{1.2}AlF_{4.2}$ | 7.0 | 541 | 10 |
| 3 | 301 | 240 | | KF | 295 | $K_2AlF_5$ | 6.9 | 558 | 22 |
| 4 | 83 | | 55 | RbF | 73 | $RbAlF_4$ | 5.5 | 510 | 6 |
| 5 | 132 | | 65 | $Cs_2CO_3$ | 136 | $CsAlF_4$ | 3.5 | 426 | 4 |
| 6 | 134 | 64 | | $Cs_2CO_3$ | 220 | $Cs_2AlF_5$ | 3.5 | 450 | 60 |

EXAMPLES 9 and 10

Mixed composites of low melting point and superior in suspension stability can be obtained by mixing fluoroaluminate alkali metals obtained by the method according to the invention. FIG. 5 shows the results of a mixed composite of potassium salt composite and cesium salt composite, and another mixed composite of potassium composite and rubidium salt composite.

TABLE 4

| Example | Mixed composites | | Melting point °C. | Suspension stability % |
|---|---|---|---|---|
| | kind | % by wt | | |
| 9 | $KAlF_{3.5}O_{0.25}$ | 75 | 510 | 91 |
| | $CsAlF_{3.5}O_{0.25}$ | 25 | | |
| 10 | $KAlF_{3.5}O_{0.25}$ | 50 | 525 | 82 |
| | $RbAlF_{3.5}O_{0.25}$ | 50 | | |

EXAMPLE 11

Mixed composites of low melting point and superior in suspension stability can be obtained by mixing fluoroaluminate of alkali metals obtained by the method according to the invention. FIG. 6 shows the results of a mixed composite of potassium salt composite, lithium salt composite and sodium salt composite.

TABLE 5

| Example | Mixed composites | | Melting point °C. | Suspension stability % |
|---|---|---|---|---|
| | kind | % by wt | | |
| 11 | $KAlF_{3.5}O_{0.25}$ | 40 | 540 | 90 |
| | $LiAlF_{3.5}O_{0.25}$ | 10 | | |
| | NaA F F | 50 | | |

EXAMPLE 12

Fluxes obtained in Examples 1 to 11 were diluted with water to prepare 5% by weight of suspension, which were then subject to a test to recognize characteristics as a brazing flux. An evaporator was experimentally made by brazing a fin of brazing sheet, comprising a core metal of JIS3003 and a surface metal of JIS4343 whose two sides are both cladded with a hard brazing alloy of Al-8%, and a porous flat aluminum tube, with the use of the aforementioned suspension. The brazing test was carried out under the conditions of drying at 150° to 200° C. and heating in a furnace of nitrogen atmosphere.

It was acknowledged as the result of this brazing test that ideal fillets were formed at the brazed portion between the fin and the tube, and that sufficiently firm brazing is achieved by using any of the fluxes obtained in Examples 1 to 11.

EXAMPLE 13

A suspension product filtered and dried was suspended by putting it into water to obtain 5% solution, which was then subject to the same test as Example 12. A preferable result was also obtained in this Example 13.

What is claimed is:

1. A brasing flux for aluminum material having superior suspension stability consisting essentially of $M_xAlF_yO_z$ wherein x=0.5 to 2.0, y=1.5 to 4.8 and z=0.1 to 1.0 and M is an alkali metal or mixture of alkali metals.

2. A brazing flux according to claim 1 wherein M is at least one selected from an alkali metal group of Li, Na, K, Rb and Cs.

3. A brazing flux according to claim 1 or claim 2, wherein the melting point of said flux is in the range of 450° to 600° C.

4. A method of producing a brazing flux according to claim 1, wherein an amorphous aluminum hydroxide is used as an aluminum raw material to prepare said flux.

5. A method of producing a brazing flux according to claim 4, wherein an amorphous aluminum hydroxide is caused to act on a product obtained by reaction between hydrofluoric acid and alkali metallic salt.

6. A method of producing a brazing flux according to claim 4, wherein an alkali metallic salt is caused to act on a product obtained by reaction between hydrofluoric acid and amorphous aluminum hydroxide.

7. A method of producing a brazing flux according to any of claims 4 to 6, wherein pH of a reaction solution at the time of completing the reaction is kept in a range of 5 to 10.

8. A method of producing a brazing flux according to any of claims 4 to 6, wherein the reaction is carried out in a temperature range of room temperature to the melting point of the reaction mixture.

9. A method of producing a brazing flux according to claim 7, wherein the reaction is carried out in a temperature range of room temperature to the melting point of the reaction mixture.

* * * * *

UNITED STATES PATENT AND TRADEMARK OFFICE
CERTIFICATE OF CORRECTION

PATENT NO. : 4,923,530
DATED : May 8, 1990
INVENTOR(S) : MIKI et al

It is certified that error appears in the above-identified patent and that said Letters Patent is hereby corrected as shown below:

On the cover page, after Item [22], the following should appear:

--[30]    Foreign Application Priority Data
    May 11, 1988 [JP]  Japan ..................63-115580--.

Signed and Sealed this

Twenty-seventh Day of August, 1991

Attest:

HARRY F. MANBECK, JR.

Attesting Officer

Commissioner of Patents and Trademarks